(12) United States Patent
Tsui et al.

(10) Patent No.: US 12,120,052 B2
(45) Date of Patent: *Oct. 15, 2024

(54) GENERATING DOWNLINK SECTOR BEAMS BASED ON UPLINK CHANNEL ESTIMATES UTILIZING A BASE BAND UNIT POOL FOR MODULAR MASSIVE MULTIPLE-INPUT MULTIPLE-OUTPUT ARRAYS

(71) Applicant: AT&T Intellectual Property I, L.P., Atlanta, GA (US)

(72) Inventors: Ernest Tsui, Pleasanton, CA (US); Brian Gavin, Sammamish, WA (US); Paul Maxwell, Alamo, CA (US); Weihua Ye, Chicago, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,480

(22) Filed: Oct. 21, 2022

(65) Prior Publication Data
US 2023/0044755 A1  Feb. 9, 2023

Related U.S. Application Data

(63) Continuation of application No. 16/944,725, filed on Jul. 31, 2020, now Pat. No. 11,509,435.

(51) Int. Cl.
*H04W 72/04*     (2023.01)
*H04B 1/10*      (2006.01)
(Continued)

(52) U.S. Cl.
CPC ......... *H04L 5/0048* (2013.01); *H04B 1/1027* (2013.01); *H04L 5/0023* (2013.01);
(Continued)

(58) Field of Classification Search
CPC . H04L 5/0048; H04L 5/0023; H04L 27/2613; H04L 25/0204; H04L 5/143;
(Continued)

(56) References Cited

U.S. PATENT DOCUMENTS 11,509,435 B2 *  11/2022  Tsui ............... H04L 25/0204
2018/0213486 A1   7/2018  Yoo et al.

OTHER PUBLICATIONS

Training Design and Channel Estimation in Uplink Cloud Radio Access Networks, 2014 (Year: 2015).
(Continued)

*Primary Examiner* — Maharishi V Khirodhar
(74) *Attorney, Agent, or Firm* — Guntin & Gust, PLC; John Rauch

(57) ABSTRACT

A system includes a base band unit pooling component that determines, via a base band unit pool of base station devices, respective uplink channel estimates of an uplink channel wirelessly coupling, using frequency division duplexing via respective modular antenna elements, a user equipment to the base band unit pool. A downlink channel estimation component of the system derives, based on the respective uplink channel estimates, a downlink channel estimate of a downlink channel wirelessly coupling, using the frequency division duplexing via a portion of the respective modular antenna elements corresponding to a base station device of the base band unit pool, the base station device to the user equipment. In turn, the system generates, using the downlink channel estimate, a group of downlink sector beams to be transmitted to the user equipment using the downlink channel via the portion of the respective modular antenna elements.

20 Claims, 11 Drawing Sheets

(51) Int. Cl.
  *H04L 5/00* (2006.01)
  *H04L 27/26* (2006.01)
  *H04W 72/21* (2023.01)
  *H04W 72/23* (2023.01)
  *H04W 76/00* (2018.01)
  *H04W 88/08* (2009.01)

(52) U.S. Cl.
  CPC ......... *H04L 27/2613* (2013.01); *H04W 72/21* (2023.01); *H04W 72/23* (2023.01)

(58) Field of Classification Search
  CPC .... H04L 5/1461; H04W 72/21; H04W 72/23; H04B 1/1027
  USPC ......................................................... 370/329
  See application file for complete search history.

(56) References Cited

OTHER PUBLICATIONS

Matteo, et al., (Enhancing LTE with Cloud-RAN and Load-Controlled Parasitic Antenna Arrays, 2016 IEEE IEEE Communications Magazine) (Year: 2016).
Pan, (Robust Beamforming Design for Ultra-Dense User-Centric C-RAN in the Face of Realistic Pilot Contamination and Limited Feedback, Feb. 2019) (Year: 2019).
Xuan, et al., (Apr. 2018, Massive CSI Acquisition for Dense Cloud RANs with spatial temporal Dynamics) (Year: 2018).

* cited by examiner

GENERATING DOWNLINK SECTOR BEAMS BASED ON UPLINK CHANNEL ESTIMATES UTILIZING A BASE BAND UNIT POOL FOR MODULAR MASSIVE MULTIPLE-INPUT MULTIPLE-OUTPUT ARRAYS

RELATED APPLICATION

The subject patent application is a continuation of, and claims priority to, U.S. patent application Ser. No. 16/944,725, filed Jul. 31, 2020, and entitled "GENERATING DOWNLINK SECTOR BEAMS BASED ON UPLINK CHANNEL ESTIMATES UTILIZING A BASE BAND UNIT POOL FOR MODULAR MASSIVE MULTIPLE-INPUT MULTIPLE-OUTPUT ARRAYS," the entirety of which priority application is hereby incorporated by reference herein.

TECHNICAL FIELD

The subject disclosure generally relates to embodiments for generating downlink sector beams based on uplink channel estimates utilizing a base band unit (BBU) pool for modular massive multiple-input multiple-output (M-MIMO) arrays.

BACKGROUND

Conventional cellular, e.g., multiple-input multiple-output (MIMO), M-MIMO, etc. technologies integrate control circuitry within and/or attached to a cellular tower, cellular antenna, etc.—such control circuitry including a remote radio head (RRH) that includes radio frequency (RF) circuitry, digital-to-analog (D/A) circuitry, analog-to-digital (A/D) circuitry, power components, etc. used to control, broadcast, receive, etc. signals via the cellular tower.

As the number of cellular bands, ports, antenna elements, etc. that have been included within or attached to cellular towers has increased, e.g., to accommodate the demand for increased communication capacity, the deployment of larger, heavier, etc. cellular towers has been limited due to antenna size restrictions, weight restrictions, etc., e.g., corresponding to rooftop placement, wind loading, etc.

Consequently, conventional cellular technologies have had some drawbacks with respect to accommodating the demand for increased communication capacity, some of which are noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
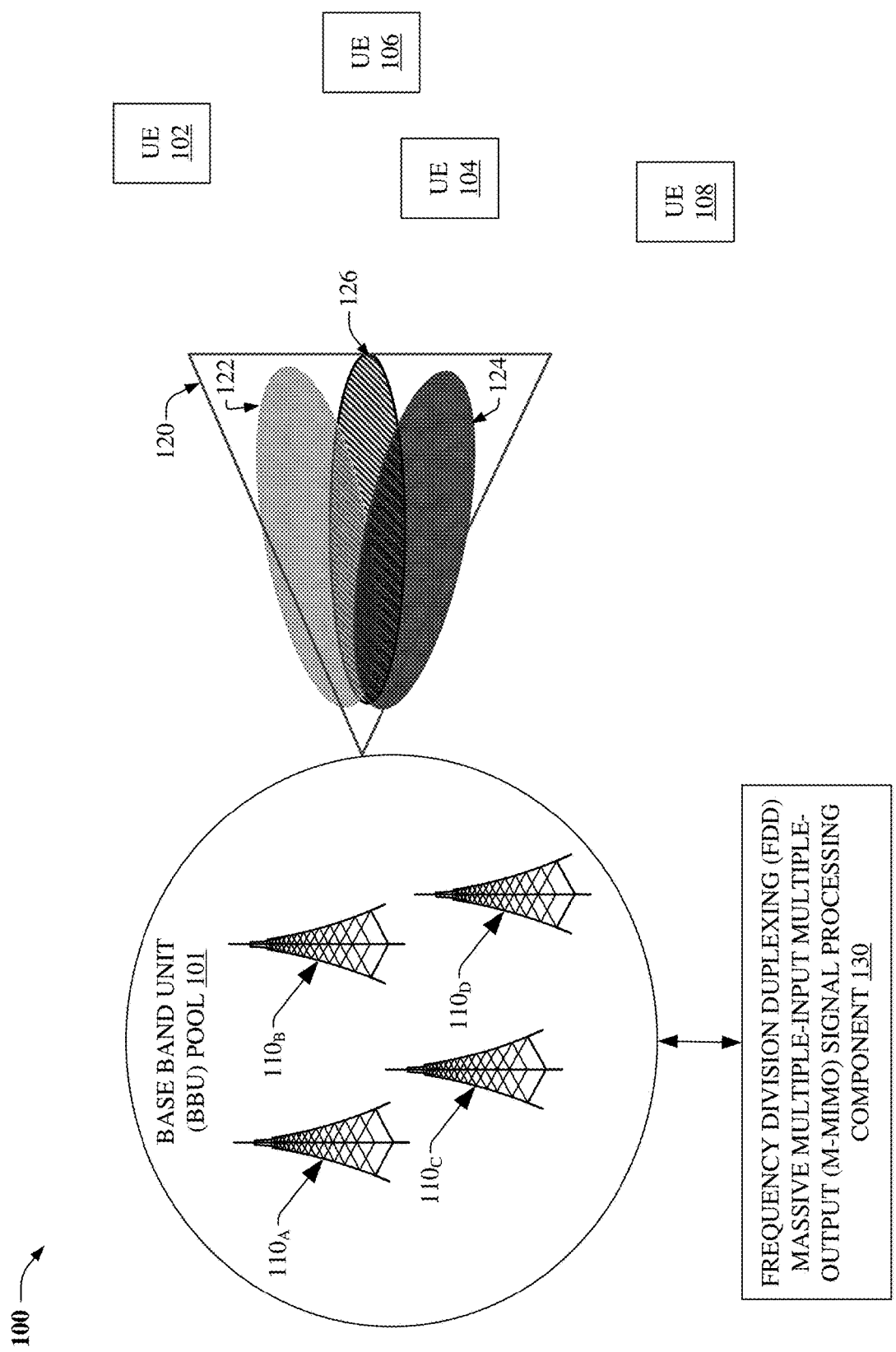
FIG. 1 illustrates a block diagram of a cellular system including a BBU pool for generating downlink sector beams based on uplink channel estimates for modular M-MIMO arrays, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional cellular technologies have had some drawbacks with respect to increasing the size and capacity of cellular towers in a M-MIMO communication environment—such technologies being limited by antenna size restrictions, weight restrictions, etc. corresponding to rooftop placement, wind loading, etc. Various embodiments disclosed herein can improve antenna throughput and performance by generating downlink sector beams based on uplink channel estimates utilizing a BBU pool for modular M-MIMO arrays.

For example, in embodiment(s), a system includes a processor and a memory that stores executable components that, when executed by the processor, facilitate performance of operations by the system, the executable components including: an FDD M-MIMO signal processing component that includes a BBU pooling component and a downlink channel estimation component.

The BBU pooling component determines, via a BBU pool of base station devices, respective uplink channel estimates of an uplink channel wirelessly coupling, using FDD via respective modular antenna elements of the BBU pool, a user equipment (EU), mobile device, etc. to the BBU pool.

The downlink channel estimation component derives, based on the respective uplink channel estimates, a downlink channel estimate of a downlink channel wirelessly coupling, using the FDD via a portion of the respective modular antenna elements corresponding to a base station device of the BBU pool, the base station device to the UE.

In turn, the FDD M-MIMO signal processing component generates, using the downlink channel estimate, a group of downlink sector beams to be transmitted to the UE using the downlink channel via the portion of the respective modular antenna elements.

In an embodiment, the BBU pooling component determines the respective uplink channel estimates utilizing data signals and respective demodulation reference signals corresponding to the data signals, in which the data signals have been received by at least a part of the base station devices of the BBU pool via a data channel wirelessly coupling the UE to the part of the base station devices.

In one embodiment, the downlink channel estimation component derives the downlink channel estimate by characterizing a channel delay spread of the uplink channel to obtain a characterization of the channel delay spread. In turn, the downlink channel estimation component derives a downlink frequency response of the downlink channel based on the characterization of the channel delay spread, an uplink frequency response of an uplink signal that has been received on the uplink channel, and an angle of arrival of the uplink signal.

In another embodiment, the downlink channel estimation component characterizes the channel delay spread of the uplink channel by determining a statistical average of the uplink channel estimate over a defined period of time that is based on a channel time coherence of the uplink channel, and by determining the statistical average of the uplink channel estimate over a frequency span that is based on a frequency coherence bandwidth of the uplink signal.

In yet another embodiment, the downlink channel estimation component derives the downlink channel estimate by deriving, based on an uplink angle of arrival of an uplink signal that has been received on the uplink channel, a downlink angle of departure of a downlink sector beam of the group of downlink sector beams via resampling based on a ratio of an uplink carrier frequency of the uplink channel to a downlink carrier frequency of the downlink channel.

In an embodiment, the FDD M-MIMO signal processing component transmits, using the downlink channel via the portion of the respective modular antenna elements, the group of downlink sector beams to the UE. In this regard, in embodiment(s), the portion of the respective modular antenna elements are placed on an antenna tower or a rooftop of a building according to a group of available positions that includes an arbitrary position on the antenna tower or the rooftop, a horizontal position on the antenna tower or the rooftop, and a vertical position on the antenna tower or the rooftop. Further, the portion of the respective modular antenna elements are connected together, communicatively coupled, etc. via software corresponding to a BBU of the BBU pool to obtain a contiguous antenna including multi-panel and/or module, modular, etc. connectivity to facilitate an enhancement of an aperture of the contiguous antenna and/or a performance of the contiguous antenna.

In one embodiment, the BBU pooling component assigns, via the respective modular antenna elements of the BBU pool, additional capacity from the BBU pool to obtain an increased aperture and increased orthogonal beams to facilitate increased simultaneous mobile terminal communications, e.g., with the UE and other UEs, over common time slots and common frequency slots.

In another embodiment, the FDD M-MIMO signal processing component transmits the group of downlink sector beams to the UE via a beam adaptation component. In this regard, the beam adaptation component adapts, via the portion of the respective modular antenna elements, respective transmissions of the group of downlink sector beams to the UE. In embodiment(s), the beam adaptation component adapts the respective transmissions by modifying one or more of: an uplink power control parameter (P0), a shape of a downlink sector beam of the group of downlink sector beams, an azimuth of a transmission of the respective transmissions, an elevation of the transmission, a power of the transmission, or a number of the downlink sector beams that are included in the group of downlink sector beams.

In yet another embodiment, the FDD M-MIMO signal processing component reduces, via a PIM interference component, an effect of passive intermodulation (PIM) interference on uplink signals that have been received from the UE. In this regard, the PIM interference component transmits, using the downlink channel via at least a part of the respective modular antenna elements of the BBU pool, null(s) directed to respective locations of a group of determined PIM interference sources.

In an embodiment, the PIM interference component avoids transmission of data in a direction associated with the determined PIM interference sources, and/or towards a beam associated with the determined passive intermodulation interference sources.

In one embodiment, the PIM interference component reduces an effect of PIM interference on uplink signals that have been received from the UE by modifying, based on a received signal covariance function, a group of uplink weights to be applied to the uplink signals, and applying, during uplink beamforming, the group of uplink weights to the uplink signals to emulate that null(s) have been directed to respective locations of a group of determined PIM interference sources.

In another embodiment, the FDD M-MIMO signal processing component reduces, via a non-served cell wireless device component, an effect of interference, corresponding to transmissions of non-served cell UE devices (e.g., UEs not being serviced via the BBU pool), on uplink signals that have been received from the UE. In this regard, the non-served cell wireless device component determines respective determined locations of the non-served cell UE devices using uplink pilot signals, sounding reference signals, and/or data signals that have been received via at least the part of the respective modular antenna elements of the BBU pool. In turn, the non-served cell wireless device component transmits, using the downlink channel via at least the part of the respective modular antenna elements of the BBU pool, null(s) directed to respective determined locations of the non-served cell UE devices.

In yet another embodiment, the FDD M-MIMO signal processing component optimizes, via a downlink channel optimization component, a communication capacity of the downlink channel while satisfying corresponding communication conditions of the downlink channel by: assigning higher communication priorities to respective communications, via the uplink channel or the downlink channel, associated with a portion of a group of mobile devices, UEs, etc. corresponding to a determined communication bandwidth that is lower than remaining determined communication bandwidths of remaining portions of the group of mobile devices; or by assigning higher transmission powers to the respective communications, via the uplink channel or the downlink channel, corresponding to the portion of the group of mobile devices.

In an embodiment, the FDD M-MIMO signal processing component further optimizes, via the downlink channel optimization component, the communication capacity of the downlink channel by: estimating the separability of the group of mobile devices via covariance cross correlation and/or via identification of specific orthogonal beams corresponding to respective locations of the mobile devices; and determining whether to schedule parallel transmissions to the mobile devices.

In this regard, in embodiment(s), in response to respective mobile devices of the group of mobile devices being determined to have different quality of service class identifiers, the FDD M-MIMO signal processing component schedules, via the downlink channel optimization component, the parallel transmissions by assigning, to the respective mobile devices, distinct priorities corresponding to the parallel transmissions to facilitate differentiation of respective qualities of service corresponding to the different quality of service class identifiers of the group of mobile devices.

In one embodiment, a method includes: determining, by a system comprising a processor via a group of base station devices of the system using FDD, uplink channel estimates of an uplink channel wirelessly coupling a UE to the group of base station devices via respective modular antenna elements of the group of base station devices; based on the uplink channel estimates, determining, by the system, a downlink channel estimate of a downlink channel wirelessly coupling, using FDD, a base station device of the group of base station devices to the UE via a portion of the respective modular antenna elements corresponding to the base station device; and based on the downlink channel estimate, generating, by the system, a group of downlink sector beams to be transmitted, via the portion of the respective modular antenna elements corresponding to the base station device, to the UE.

In another embodiment, the method further includes: mitigating, by the system, interference from a portion of base station devices of the group of base station devices that are located at an edge of a wireless coverage area of the group of base station devices by reassigning orthogonal pilot signal(s) corresponding to non-served cell UE devices corresponding to the portion of base station devices.

In yet another embodiment, the method further includes: minimizes, by the system via a characteristic of a passive gain of the portion of the respective modular antenna elements or via a reduction of respective transmit powers to a center portion of a cell corresponding to the respective modular antenna elements, an amount of energy corresponding to downlink transmissions via the portion of the respective modular antenna elements In an embodiment, a non-transitory machine-readable medium includes executable instructions that, when executed by a base station device comprising a processor, facilitate performance of operations, comprising: deriving, using a BBU pool of base station devices, an uplink channel characteristic of an uplink channel wirelessly coupling, using respective modular antenna panels of the base station devices via FDD, a UE to the BBU pool; based on the uplink channel estimate, deriving a downlink channel estimate of a downlink channel wireless coupling, using a portion of the respective modular antenna panels via the FDD, the UE to a base station device of the BBU pool; and based on the downlink channel estimate, generating a group of downlink sector beams to be transmitted to the UE using the downlink channel via the portion of the respective modular antenna panels.

In one embodiment, the operations further include: using the portion of the respective modular antenna panels, adapting respective transmissions of the group of downlink sector beams to facilitate a reduction of interference corresponding to non-served cell UE(s) or a source of PIM interference.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As described above, conventional cellular technologies have had some drawbacks with respect to accommodating the demand for increased communication capacity of cellular towers. In this regard, the deployment of larger, heavier, etc. cellular towers to accommodate such demand has been limited due to antenna size restrictions, weight restrictions, etc., e.g., corresponding to rooftop placement, wind loading, etc. To address these and other concerns of conventional cellular technologies, various embodiments disclosed herein can improve antenna throughput and performance by generating, based on uplink channel estimates, downlink sector beams via a BBU pool for modular M-MIMO arrays.

Figure 2:
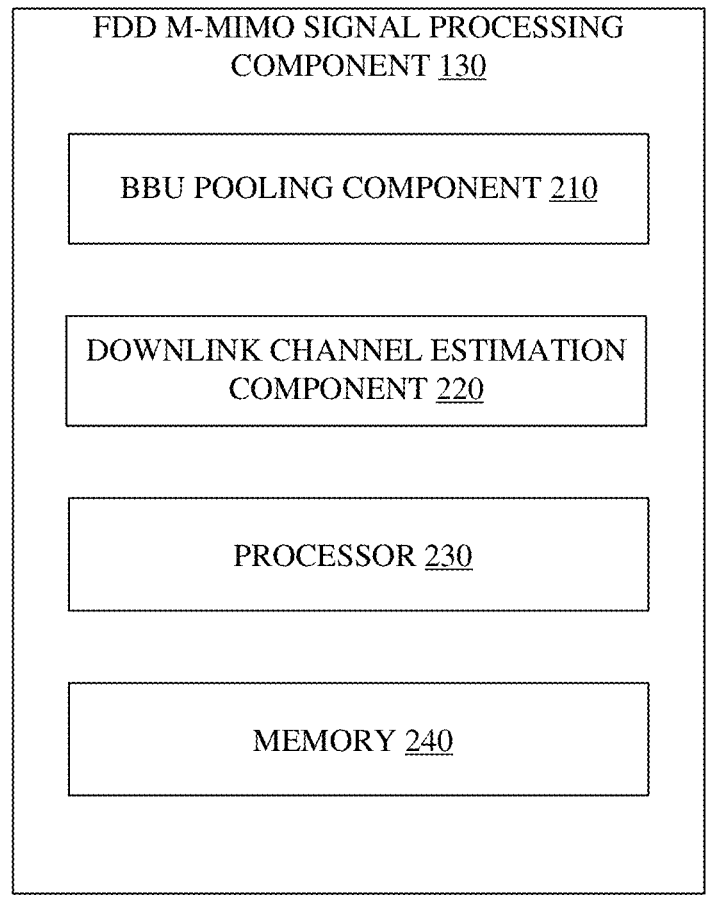
FIG. 2 illustrates a block diagram of a frequency division duplexing (FDD) M-MIMO signal processing component, in accordance with various example embodiments.

Now referring to FIGS. 1-2, block diagrams of a cellular system (100) including a BBU pool (101) of base station devices (110A, 110B, 110C, 110D) for generating downlink sector beams (120) based on uplink channel estimates for modular M-MIMO arrays, and an FDD M-MIMO signal processing component (130) are illustrated, respectively, in accordance with various example embodiments. The FDD M-MIMO signal processing component includes a BBU pooling component (210) and a downlink channel estimation component (220).

The BBU pooling component determines, via the BBU pool of base station devices, respective uplink channel estimates of an uplink channel wirelessly coupling, using FDD via respective modular antenna elements of the BBU pool, a user equipment (EU), mobile device, etc. (e.g., 106) to the BBU pool. In this regard, in embodiment(s), portion(s) (see, e.g., 310A, 310B, 310C illustrated by FIG. 3) of the respective modular antenna elements, e.g., of one or more of the base station device of the BBU pool, are connected together, communicatively coupled, etc. via software corresponding to a BBU of the BBU pool to obtain a contiguous antenna including multi-panel, modular, module, etc. connectivity to facilitate an enhancement of an aperture of the contiguous antenna, a performance of the contiguous antenna, etc. In this regard, although portions of the respective modular antenna elements of the base station device (110B) are illustrated as forming the contiguous antenna, it should be appreciated that other portions of the respective modular antenna elements of other base station devices (e.g., 110A, 110C, 110D) of the BBU pool can be part of, connected to, communicatively coupled with, etc. the portions of the respective modular antenna elements of the base station device to form the contiguous antenna.

In an embodiment, the BBU pooling component determines the respective uplink channel estimates utilizing data signals and respective demodulation reference signals corresponding to the data signals, in which the data signals have been received by at least a part of the base station devices of the BBU pool via a data channel wirelessly coupling the UE to the part of the base station devices.

The downlink channel estimation component derives, based on the respective uplink channel estimates, a downlink channel estimate of a downlink channel wirelessly coupling, using the FDD via a portion (e.g., 310A, 310B, 310C) of the respective modular antenna elements corresponding to a base station device (e.g., 110B) of the BBU pool, the base station device to the UE.

In one embodiment, the downlink channel estimation component derives the downlink channel estimate, e.g., comprising a downlink frequency response of the downlink channel, by characterizing a channel delay spread of the uplink channel to obtain a characterization of the channel delay spread. In turn, the downlink channel estimation component derives the downlink frequency response of the downlink channel based on the characterization of the channel delay spread, an uplink frequency response of an uplink signal that has been received on the uplink channel, and an angle of arrival of the uplink signal.

In another embodiment, the downlink channel estimation component characterizes the channel delay spread of the uplink channel by determining a statistical average of the uplink channel estimate over a defined period of time that is based on a channel time coherence, or coherence time, of the uplink channel, and over a frequency span that is based on a frequency coherence bandwidth, or coherence bandwidth, of the uplink signal.

In yet another embodiment, the downlink channel estimation component derives the downlink channel estimate by deriving, based on an uplink angle of arrival of an uplink signal that has been received on the uplink channel, a downlink angle of departure of a downlink sector beam of the group of downlink sector beams via resampling—the resampling being based on a ratio of an uplink carrier frequency of the uplink channel to a downlink carrier frequency of the downlink channel.

Figure 3:
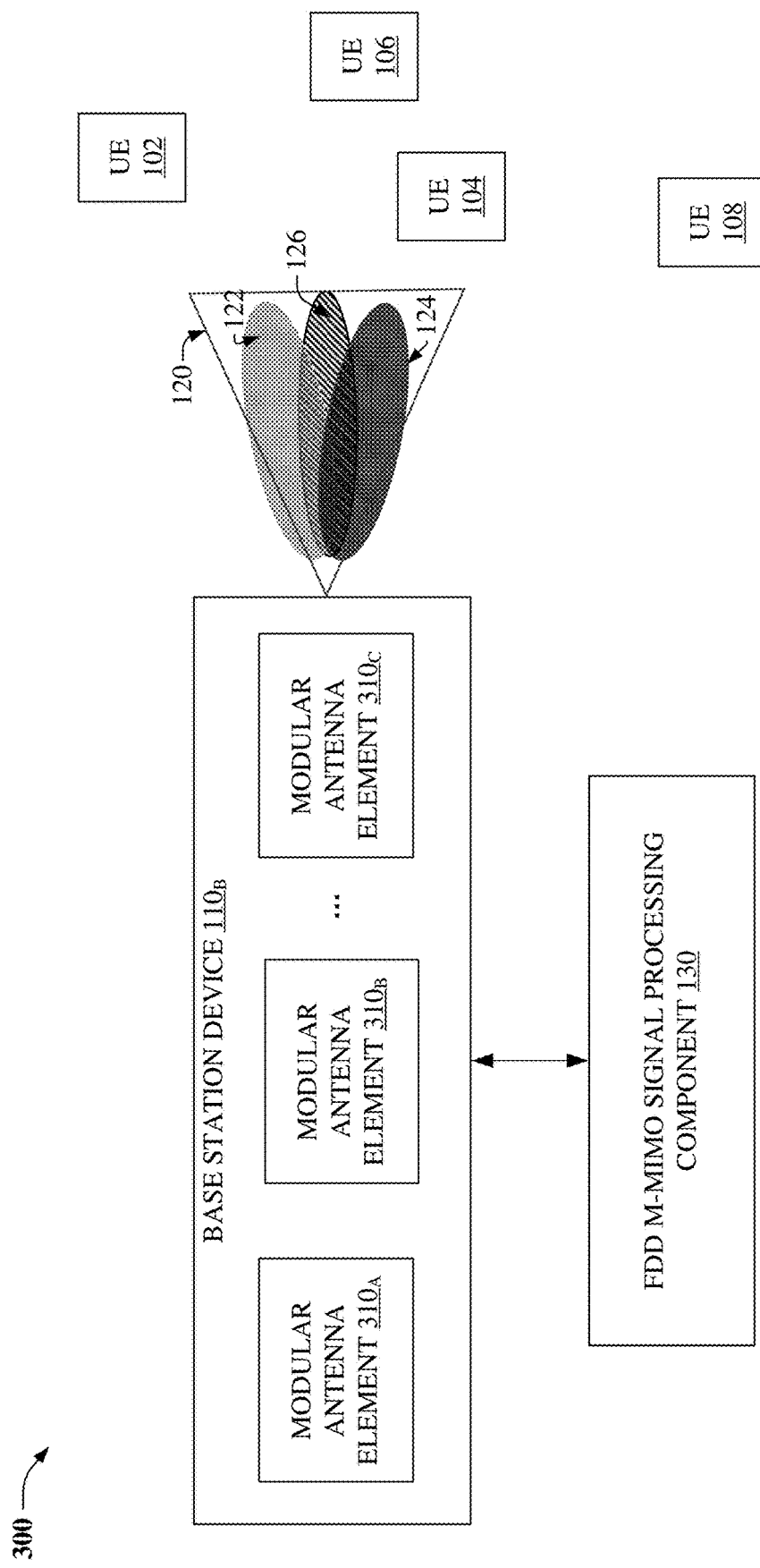
FIG. 3 illustrates a block diagram of a base station device of a BBU pool including modular antenna elements, in accordance with various example embodiments.

Referring now to FIG. 3, the FDD M-MIMO signal processing component generates, using the downlink channel estimate, a group (e.g., 120) of downlink sector beams (e.g., 122, 124, 126) to be transmitted to the UE via the downlink channel using the portion of the respective modular antenna elements corresponding to the base station device of the BBU pool.

In this regard, in embodiment(s), the FDD M-MIMO signal processing component performs "digital sectorization" of a sector (120) by dividing a downlink sector into respective, e.g., two, sectors, and generates downlink sector beams 122 and 124 corresponding to the respective sectors and having beam widths of approximately 40 degrees.

In turn, the FDD M-MIMO signal processing component transmits, using the downlink channel via the portion of the respective modular antenna elements, the group of downlink sector beams (122 and 124) to the UE. In this regard, in an embodiment, the intersection of beams 122 and 124 are represented, modeled, etc. by beam 126, e.g., comprising a beam width of approximately 40 degrees.

In one embodiment, the BBU pooling component assigns, via the respective modular antenna elements of the BBU pool, additional capacity from the BBU pool, e.g., to obtain an increased aperture and/or performance for a contiguous antenna including multi-panel and/or module connectivity. In this regard, the contiguous antenna includes portions of the respective modular antenna elements of the base station device (110B) and other portions of the respective modular antenna elements of other base station device(s) (e.g., 110A, 110C, 110D) of the BBU pool that have been connected together, communicatively coupled, etc. via software corresponding to a BBU of the BBU pool.

In embodiment(s), the respective modular antenna elements are identical, e.g., each modular antenna element comprising defined common attribute(s) with respect to, e.g., shape, dimension, size, number of antenna elements, etc.—such common attributes enabling a defined number of modular antenna elements to be connected, communicatively coupled, etc. together in a "plug-and-play" manner, e.g., to form, in combination, a unified, combined, etc. cellular antenna, e.g., the contiguous antenna, of a configurable size, a configurable number of antenna elements, etc.

Figure 4:
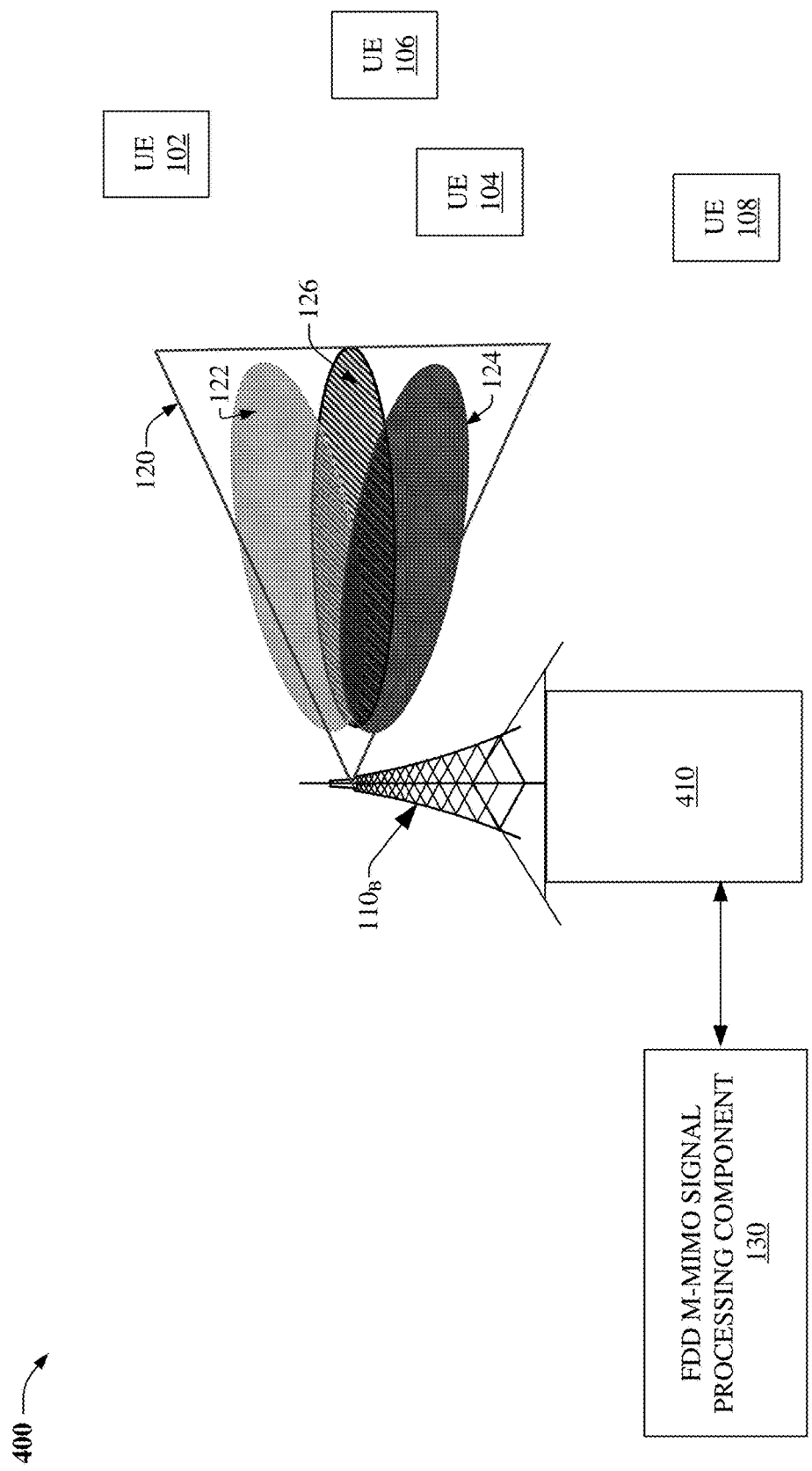
FIG. 4 illustrates a block diagram of a base station device on a rooftop of a building for generating downlink sector beams based on uplink channel estimates for modular M-MIMO arrays, in accordance with various example embodiments.

In an embodiment illustrated by FIG. 4, the portion of the respective modular antenna elements are placed on an antenna tower (110B) on a roof top of a building (410) according to a position on the antenna tower that has been selected from a group of available positions—the group of available positions including an arbitrary, horizontal, and vertical position.

In yet another embodiment, the BBU pooling component assigns, via the respective modular antenna elements of the BBU pool, additional capacity from the BBU pool to obtain, e.g., via the contiguous antenna, an increased aperture and increased orthogonal beams to facilitate increased simultaneous mobile terminal, UE, etc. communications, e.g., with the UE and other UEs (e.g., 102, 104, 106), over common time slots and common frequency slots.

Figure 5:
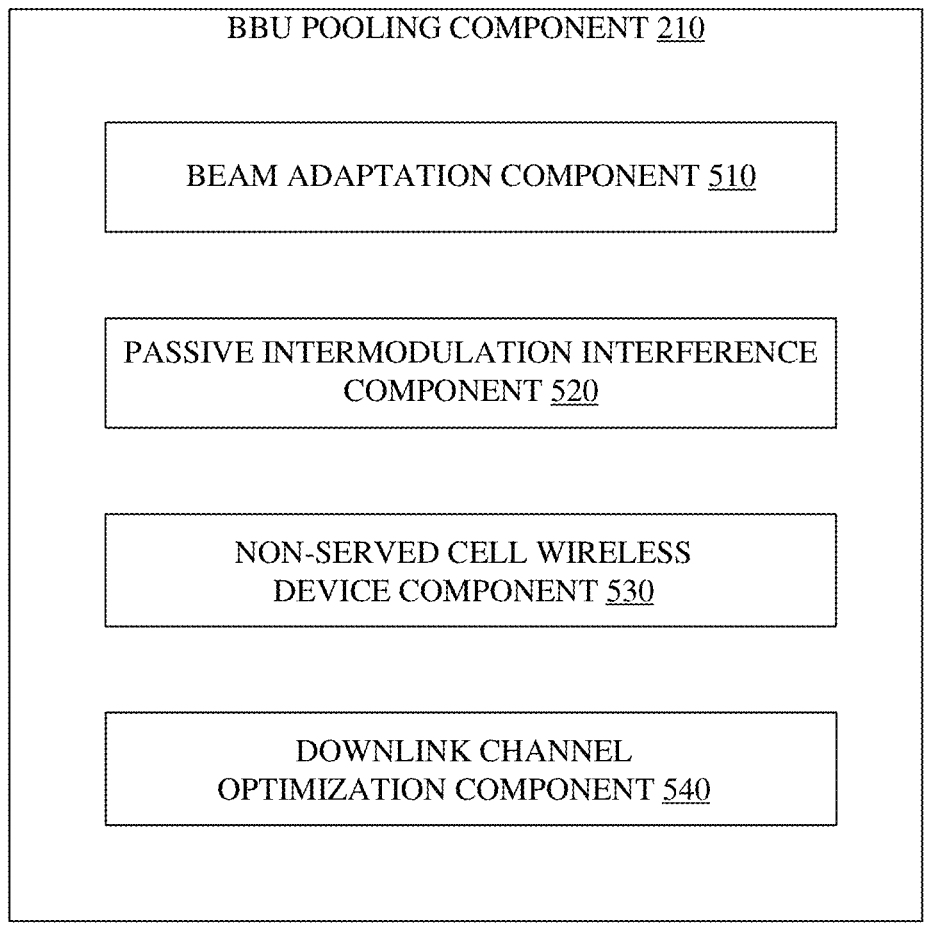
FIG. 5 illustrates a block diagram of a BBU pooling component, in accordance with various example embodiments.

Now referring to an embodiment illustrated by FIG. 5, the BBU pooling component includes a beam adaptation component (510), a PIM interference component (520), a non-served cell wireless device component (530), and a downlink channel optimization component (540).

The beam adaptation component adapts, via the portion of the respective modular antenna elements, respective transmissions of the group of downlink sector beams to the UE. In embodiment(s), the beam adaptation component adapts the respective transmissions by modifying one or more of: an uplink power control parameter (P0), a shape of a downlink sector beam of the group of downlink sector beams, an azimuth of a transmission of the respective transmissions of the group of downlink sector beams, an elevation of the transmission, a power of the transmission, or a number of the downlink sector beams that are included in the group of downlink sector beams.

For example, the beam adaptation component can change the downlink sector beam to be narrower or fatter. In another example, the beam adaptation component can modify lobes, an amount of the lobes, etc. that are included in the downlink sector beam. In yet another example, the beam adaptation component can modify a number of nulls that are included in the downlink sector beam.

Figure 6:
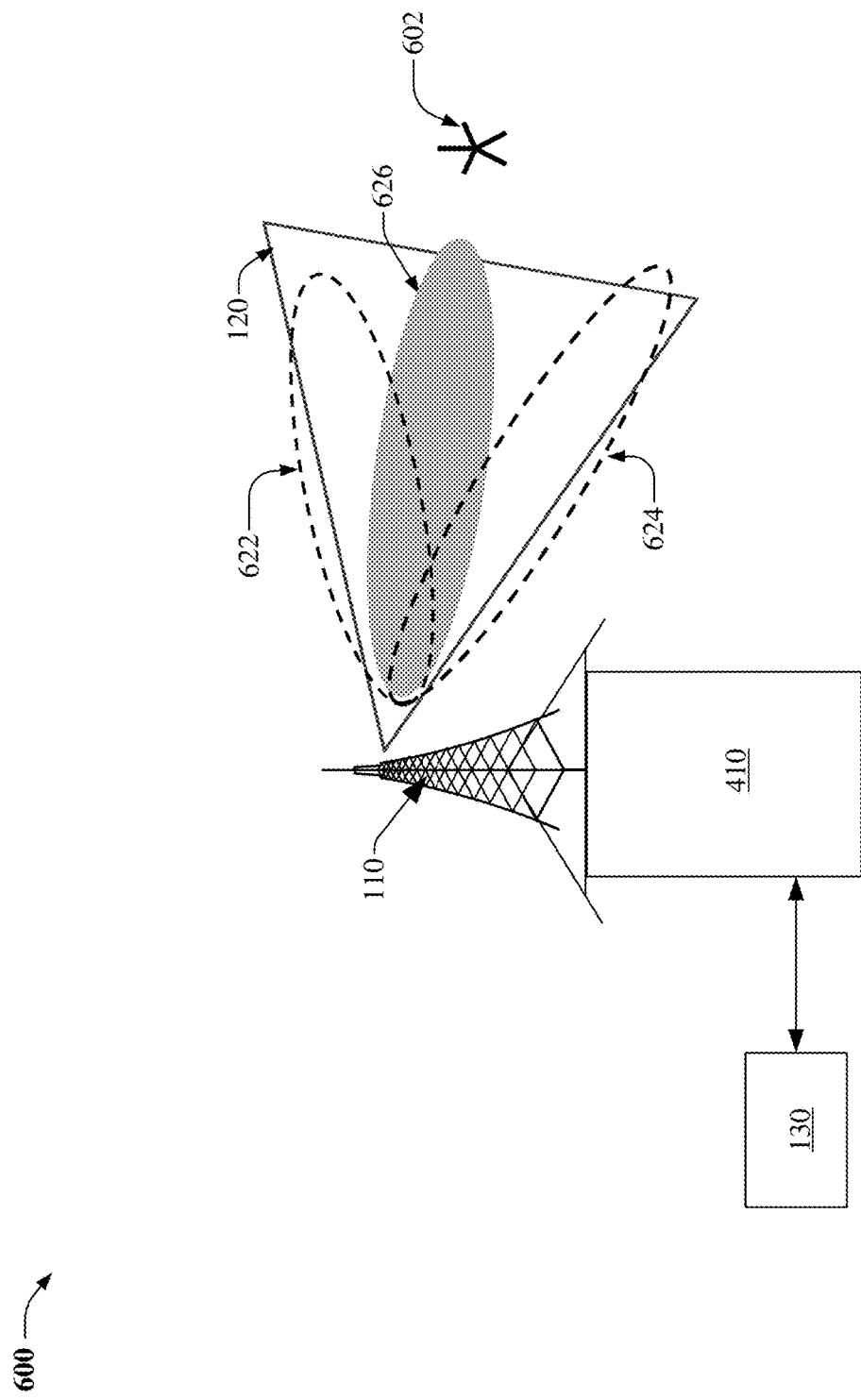
FIGS. 6-7 illustrate block diagrams of a base station device on a rooftop of a building for facilitating a reduction of uplink noise corresponding to passive intermodulation (PIM) interference, in accordance with various example embodiments.

Referring now to FIG. 6, the PIM interference component reduces an effect of PIM interference on uplink signals that have been received from wireless devices (e.g., 102, 104, 106) by transmitting, steering, etc., via the group of downlink sector beams, null(s) directed to respective locations of determined PIM interference source(s) (e.g., 602).

In this regard, in one embodiment, the PIM interference component applies, fully loads, etc. pseudo random data, artificial data, etc. to respective downlink orthogonal beams (622, 624), and performs an orthogonal beam scan of the respective downlink orthogonal beams, e.g., transmitting, sweeping, etc. the respective downlink orthogonal beams, e.g., via different transmission powers, towards a field of view, e.g., an entire transmission area of the sector (120), e.g., spanning a transmission space, area, etc. of the portion of the respective modular antenna elements, the contiguous antenna, etc.

In turn, the PIM interference component monitors, determines, etc., e.g., during uplink beam forming, uplink noise that has been incurred on uplink signals that have been received from the wireless devices and that corresponds to each downlink beam of the respective downlink orthogonal beams. Further, the PIM interference component determines a location of a PIM interference source (602) based on the uplink noise, and derives a null (626) corresponding to the location of the PIM interference.

Figure 7:
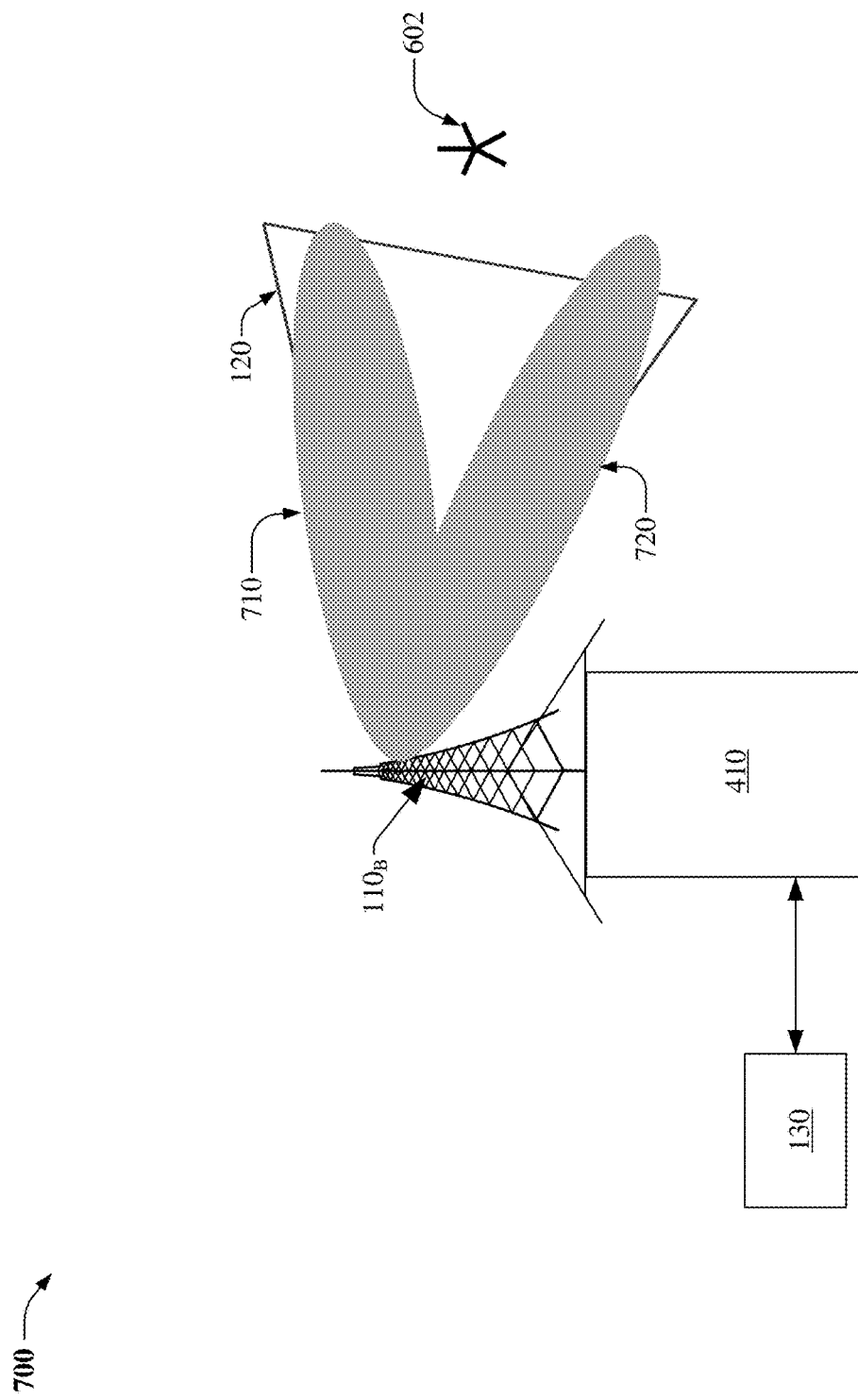

Furthermore, in an embodiment illustrated by FIG. 7, the PIM interference component transmits, via downlink sector beams 710 and 720 using at least a part of the respective modular antenna elements of the BBU pool, the null directed to the PIM interference source.

In another embodiment, the PIM interference component avoids transmission of data in a direction associated with a PIM interference source, and/or in a direction towards a beam associated with the PIM interference source.

In yet another embodiment, the PIM interference component reduces an effect of PIM interference on uplink signals that have been received from the UE by modifying, based on a received signal covariance function, a group of uplink weights to be applied to the uplink signals; and applying, during uplink beamforming, the group of uplink weights to the uplink signals to emulate that null(s) have been directed to respective locations of a group of determined PIM interference sources corresponding to the PIM interference.

In embodiment(s), the non-served cell wireless device component reduces an effect of interference, corresponding to transmissions of non-served cell UE devices (e.g., 108), on uplink signals that have been received from the UE. In this regard, the non-served cell wireless device component determines respective determined locations of the non-served cell UE devices, e.g., which are communicatively coupled to other base station device(s) (not shown) that are not part of the BBU pool, using uplink pilot signals, sounding reference signals, and/or data signals that have been received via at least the part of the respective modular antenna elements of the BBU pool. In turn, the non-served cell wireless device component transmits, using the downlink channel via at least the part of the respective modular antenna elements of the BBU pool, null(s) directed to respective determined locations of the non-served cell UE devices.

In other embodiment(s), the downlink channel optimization component optimizes a communication capacity of the downlink channel while satisfying corresponding communication conditions of the downlink channel by assigning higher communication priorities to respective communications, via the uplink channel or the downlink channel, associated with a portion of a group of mobile devices corresponding to a determined communication bandwidth that is lower than remaining determined communication bandwidths of remaining portions of the group of mobile devices; or by assigning higher transmission powers to the respective communications, via the uplink channel or the downlink channel, corresponding to the portion of the group of mobile devices.

In yet other embodiment(s), the downlink channel estimation component further optimizes the communication capacity by estimating the separability of the group of mobile devices via covariance cross correlation and/or via identification of specific orthogonal beams corresponding to respective locations of the mobile devices; and by determining whether to schedule parallel transmissions to the mobile devices.

In this regard, in embodiment(s), in response to respective mobile devices of the group of mobile devices being determined to have different quality of service class identifiers, the downlink channel estimation component schedules the parallel transmissions by assigning, to the respective mobile devices, distinct priorities corresponding to the parallel transmissions to facilitate differentiation of respective qualities of service corresponding to the different quality of service class identifiers of the group of mobile devices.

Figure 8:
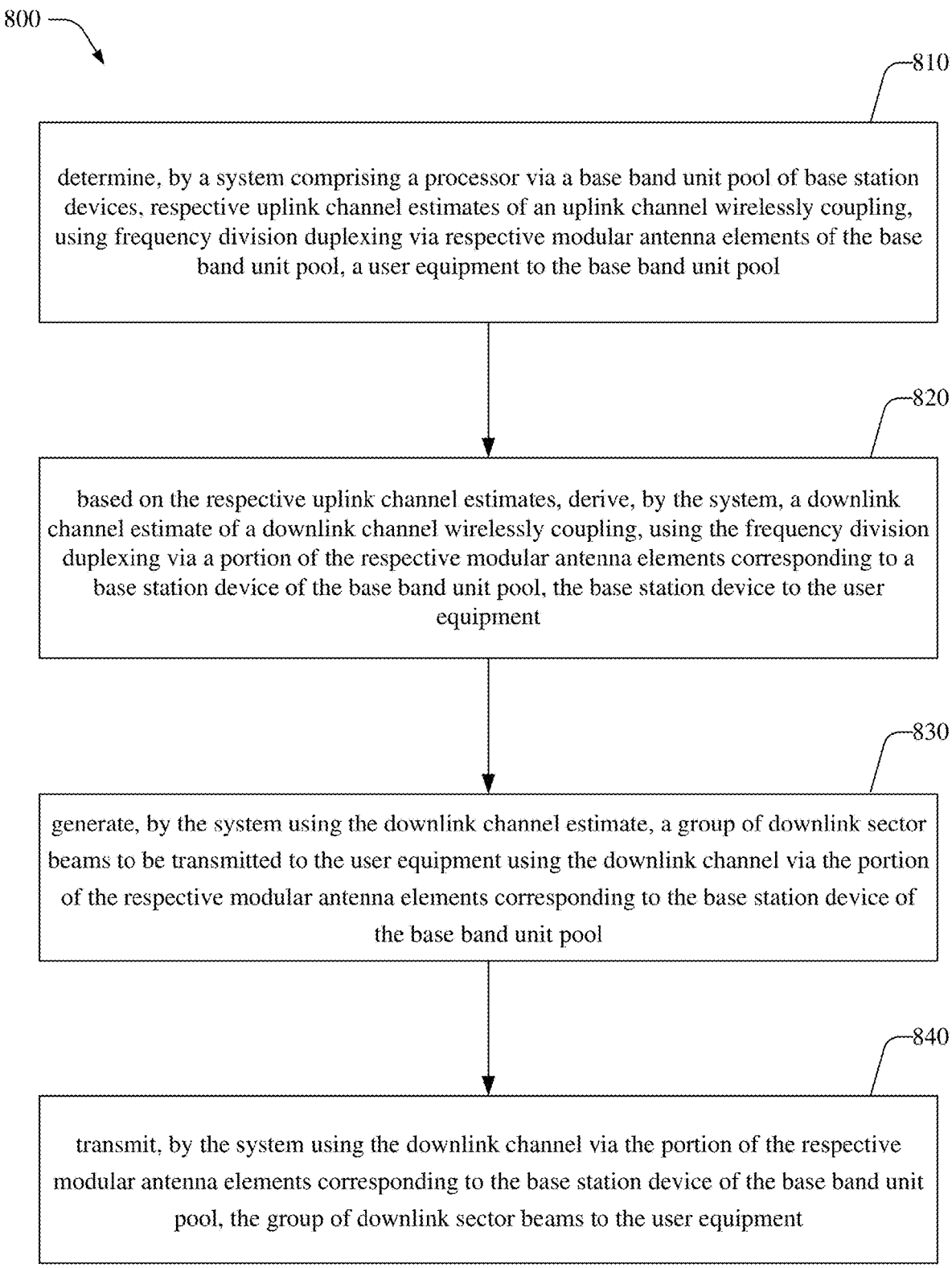
FIG. 8 illustrates a flow chart of a method associated with a cellular system including a BBU pool for generating downlink sector beams based on uplink channel estimates for modular M-MIMO arrays, in accordance with various example embodiments.
Figure 9:
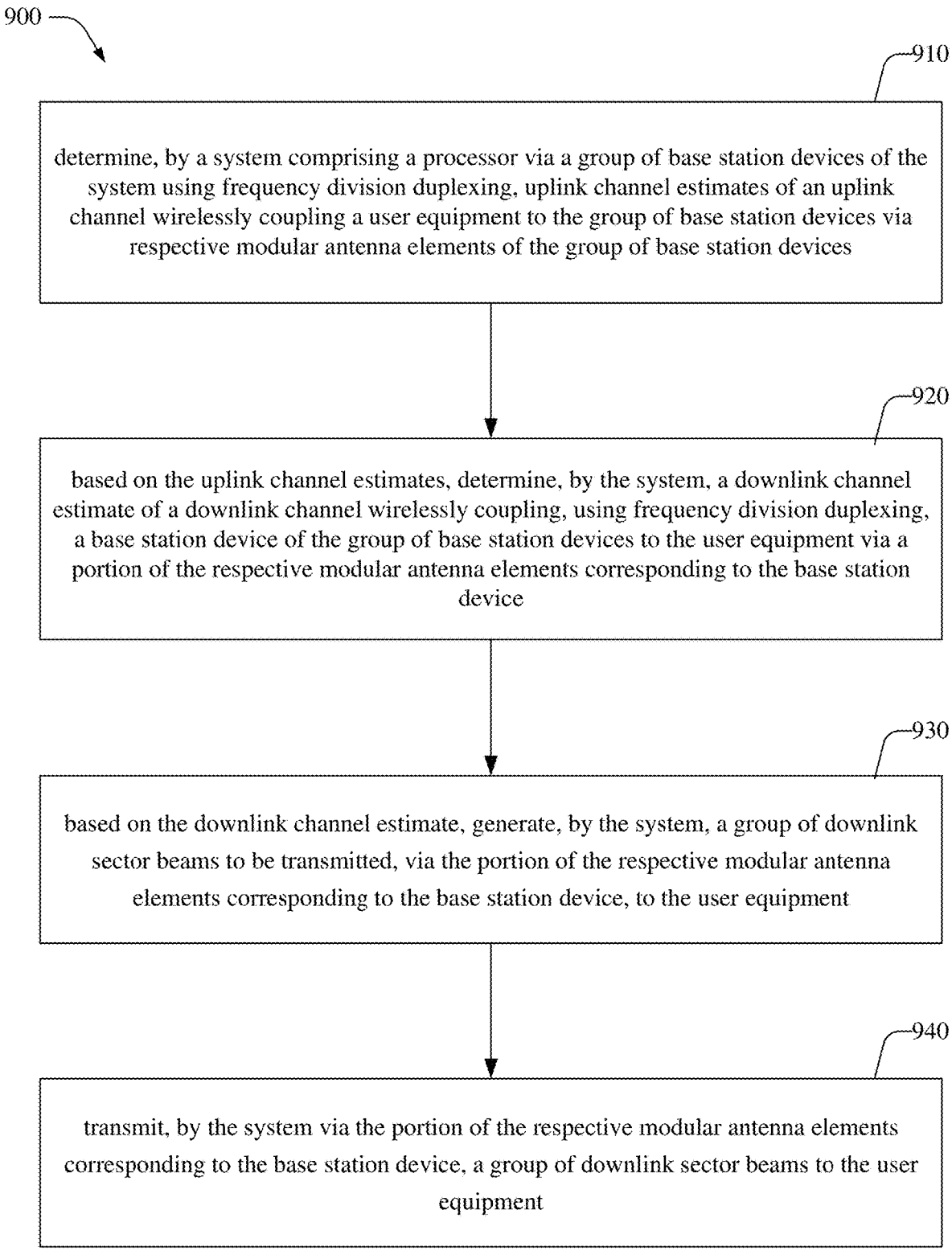
FIG. 9 illustrates a flow chart of another method associated with a cellular system including a BBU pool for generating downlink sector beams based on uplink channel estimates for modular M-MIMO arrays, in accordance with various example embodiments.

FIGS. 8-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 8, a flowchart of a method (800) associated with a system, cellular system (100), etc. including a BBU pool for generating downlink sector beams based on uplink channel estimates for modular M-MIMO arrays is illustrated, in accordance with various example embodiments. At 810, the system determines, via a BBU pool of base station devices, respective uplink channel estimates of an uplink channel wirelessly coupling, using FDD via respective modular antenna elements of the BBU pool, a UE to the BBU pool.

At 820, the system derives, based on the respective uplink channel estimates, a downlink channel estimate of a downlink channel wirelessly coupling, using the FDD via a portion of the respective modular antenna elements corresponding to a base station device of the BBU pool, the base station device to the UE.

At 830, the system generates, using the downlink channel estimate, a group of downlink sector beams to be transmitted to the UE using the downlink channel via the portion of the respective modular antenna elements corresponding to the base station device of the BBU pool.

At 840, the system transits, using the downlink channel via the portion of the respective modular antenna elements corresponding to the base station device of the BBU pool, the group of downlink sector beams to the UE.

FIG. 9 illustrates a flowchart of another method (900) associated with a system, cellular system (100), etc. including a BBU pool for generating downlink sector beams based on uplink channel estimates for modular M-MIMO arrays, in accordance with various example embodiments. At 910, the system determines, via a group of base station devices of the system using FDD, uplink channel estimates of an uplink channel wirelessly coupling a UE to the group of base station devices via respective modular antenna elements of the group of base station devices.

At 920, the system determines, based on the uplink channel estimates, a downlink channel estimate of a downlink channel wirelessly coupling, using FDD, a base station device of the group of base station devices to the UE via a portion of the respective modular antenna elements corresponding to the base station device.

At 930, the system generates, based on the downlink channel estimate, a group of downlink sector beams to be transmitted, via the portion of the respective modular antenna elements corresponding to the base station device, to the UE.

At 940, the system transmits, via the portion of the respective modular antenna elements corresponding to the base station device, a group of downlink sector beams to the UE.

Figure 10:
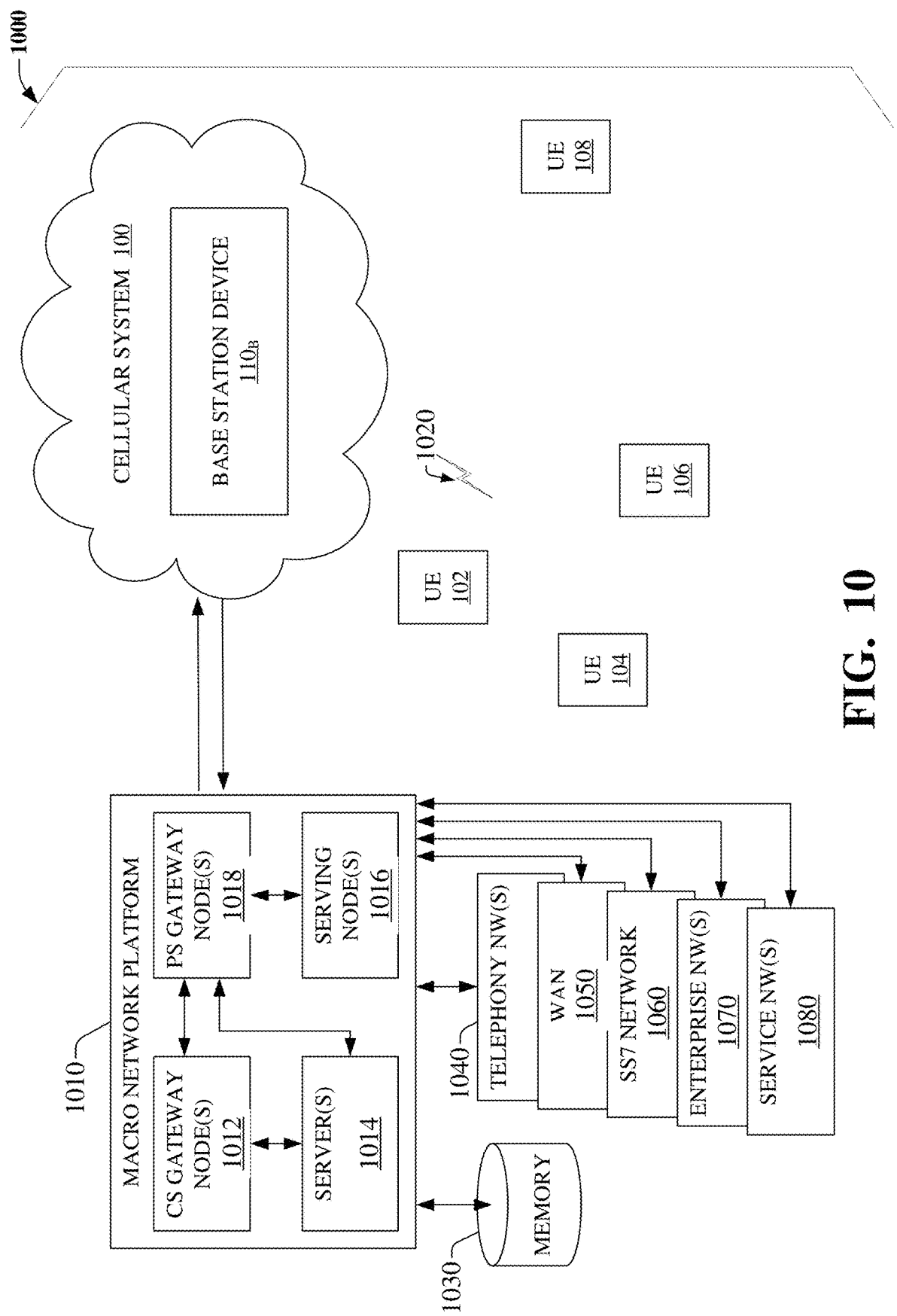
FIG. 10 illustrates a block diagram of a wireless network environment, in accordance various example embodiments.

With respect to FIG. 10, a wireless communication environment 1000 including macro network platform 1010 is illustrated, in accordance with various embodiments. Macro network platform 1010 serves or facilitates communication with a device (102, 104, 106, 108) via a cellular system (100). It should be appreciated that in cellular wireless technologies, e.g., 3GPP UMTS, high speed packet access (HSPA), 3GPP LTE, third generation partnership project 2 (3GPP2), ultra-mobile broadband (UMB), LTE-A, 5G, etc. that can be associated with the cellular system, macro network platform 1010 can be embodied in a core network. It is noted that the cellular system can include base station(s), base transceiver station(s), access point(s), etc. (e.g., 110A-D, eNBs, gNBs, etc.) and associated electronic circuitry and deployment site(s), in addition to a wireless radio link (1020) operated in accordance with the base station(s), etc. Accordingly, the cellular system can comprise various coverage cells, or wireless coverage areas. In addition, it should be appreciated that elements and/or components, e.g., of the cellular system, can be located/included within one or more components/elements, e.g., hardware, software, etc., of wireless communication environment 1000, e.g., macro network platform 1010, etc.

Generally, macro network platform 1010 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication. In various embodiments, macro network platform 1010 includes CS gateway (GW) node(s) 1012 that can interface CS traffic received from legacy networks like telephony network(s) 1040, e.g., public switched telephone network (PSTN), public land mobile network (PLMN), Signaling System No. 7 (SS7) network 1060, etc. CS GW node(s) 1012 can authorize and authenticate traffic, e.g., voice, arising from such networks. Additionally, CS GW node(s) 1012 can access mobility or roaming data generated through SS7 network 1060; for instance, mobility data stored in a visitor location register (VLR), which can reside in memory 1030. Moreover, CS GW node(s) 1012 interfaces CS-based traffic and signaling with PS GW node(s) 1018. As an example, in a 3GPP UMTS network, PS GW node(s) 1018 can be embodied in GW general packet radio service (GPRS) support node(s) (GGSN).

As illustrated by FIG. 10, PS GW node(s) 1018 can receive and process CS-switched traffic and signaling via CS GW node(s) 1012. Further PS GW node(s) 1018 can authorize and authenticate PS-based data sessions, e.g., via the cellular system, with served devices, communication devices, etc. Such data sessions can include traffic exchange with networks external to macro network platform 1010, like wide area network(s) (WANs) 1050; enterprise networks (NWs) 1070, e.g., E911, service NW(s) 1080, e.g., an IP multimedia subsystem (IMS), etc. It should be appreciated that local area network(s) (LANs), which may be a part of enterprise NW(s) 1070, can also be interfaced with macro network platform 1010 through PS GW node(s) 1018. PS GW node(s) 1018 can generate packet data contexts when a data session is established, e.g., associated with an EPS bearer context activation. To that end, in an aspect, PS GW node(s) 1018 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS GW node(s) 1018 (e.g., GGSN) and tunnel interface (e.g., TTG) comprise a packet data GW (PDG).

Macro network platform 1010 also includes serving node(s) 1016 that can convey the various packetized flows of information, or data streams, received through PS GW node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1010. Data streams can be conveyed to PS GW node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS GW node(s) 1012 and PS GW node(s) 1018 can enact. Moreover, server(s) 1014 can provision services from external network(s), e.g., WAN 1050, or global positioning system (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In wireless communication environment 1000, memory 1030 can store information related to operation of macro network platform 1010, e.g., related to operation of a base station device (e.g., 110B), etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via the cellular system; and so forth. Memory 1030 can also store information from at least one of telephony network(s) 1040, WAN 1050, SS7 network 1060, enterprise NW(s) 1070, or service NW(s) 1080.

In one or more embodiments, components of wireless communication environment 1000 can provide communication services to the device utilizing an over-the-air wireless link (e.g., 1020) via the cellular system. In this regard, the cellular system can include one or more: macro, Femto, or pico access points (APs) (not shown); base stations (e.g., 110B); landline networks (e.g., optical landline networks, electrical landline networks) (not shown) communicatively coupled between the device and macro network platform 1010, etc.

Wireless communication environment 1000 can include one or more of the Internet (or another communication network (e.g., IP-based network)), or DSL-type or broadband network facilitated by Ethernet or other technology. In various embodiments, wireless communication environment 1000 can include hardware and/or software for allocating resources to the device and the cellular system, converting or enforcing protocols, establishing and/or providing levels of quality of service (QoS), providing applications or services, translating signals, and/or performing other desired functions to facilitate system interoperability and communication to/from the device and the cellular system.

In other embodiment(s), wireless communication environment 1000 can include data store component(s), a memory configured to store information, computer-readable storage media storing computer-executable instructions, e.g., memory 240, memory 1030, etc. enabling various operations performed via wireless system as described herein.

As it employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store," "memory storage," "memory component", "memory", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 240, memory 1030, system memory 1106 (see below), external storage 1116 (see below), and/or memory storage 1152 (see below). Further, nonvolatile memory can be included in read only memory (ROM), programmable ROM (PROM), electrically programmable ROM (EPROM), electrically erasable ROM (EEPROM), or flash memory. Volatile memory 1020 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
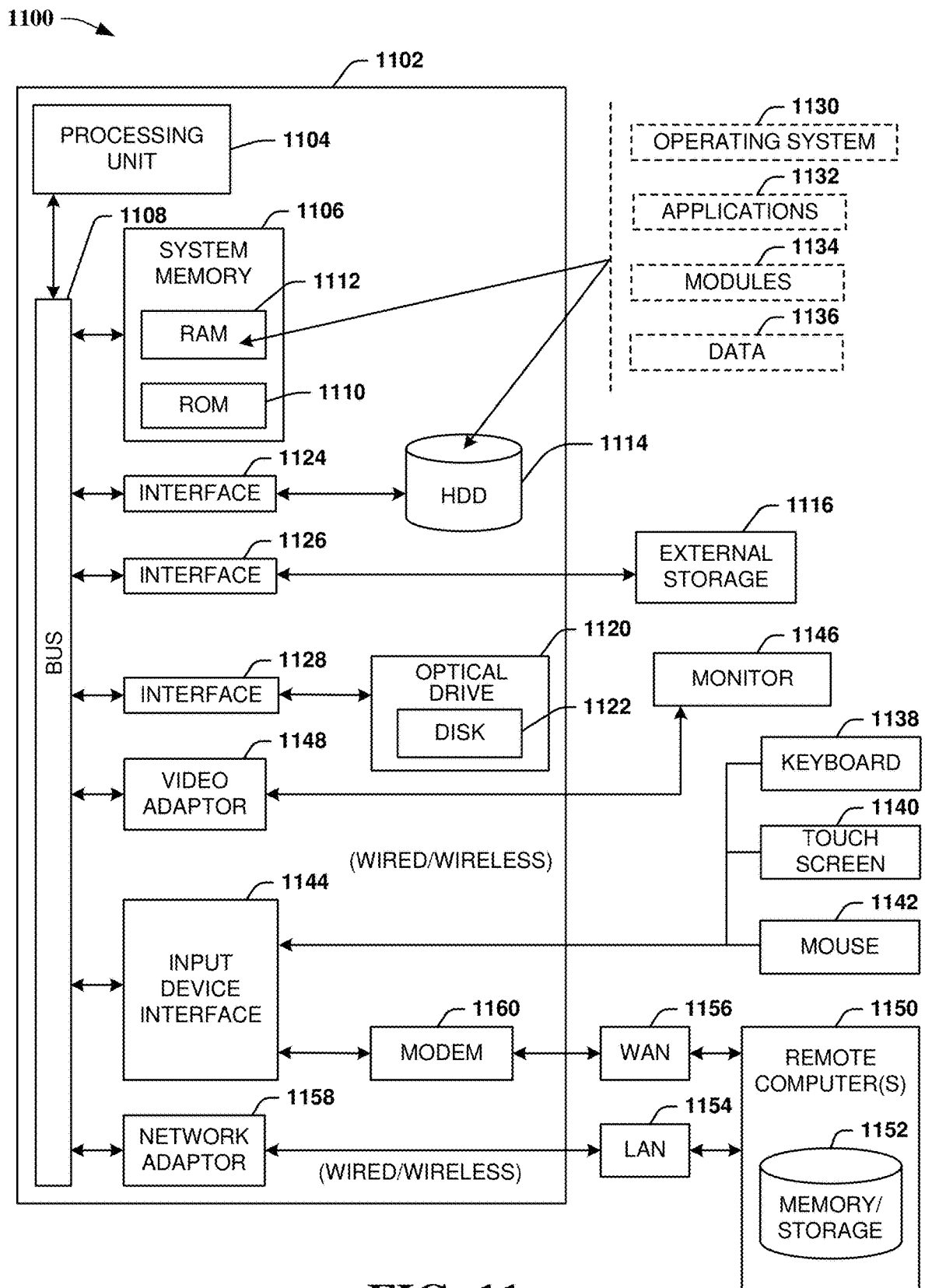
FIG. 11 is a block diagram representing an illustrative non-limiting computing system or operating environment in which one or more aspects of various embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that in various embodiments, methods disclosed herein can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), xth generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, and/or within one or more elements of a network infrastructure, e.g., radio network controller, wireless access point (AP), etc.

Moreover, terms like "user equipment" (UE), "mobile device", "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a wireless system (see e.g., 100), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless device, e.g., a wireless communication device, a user equipment, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., 100), including but not limited to: determining, via a BBU pool of base station devices, respective uplink channel estimates of an uplink channel wirelessly coupling, using FDD via respective modular antenna elements of the BBU pool, a UE to the BBU pool; based on the respective uplink channel estimates, deriving a downlink channel estimate of a downlink channel wirelessly coupling, using the FDD via a portion of the respective modular antenna elements corresponding to a base station device of the BBU pool, the base station device to the UE; and generating, using the downlink channel estimate, a group of downlink sector beams to be transmitted to the UE using the downlink channel via the portion of the respective modular antenna elements corresponding to the base station device of the BBU pool.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations by the processor, comprising:
      determining, via a base band unit pool of base station devices, respective uplink channel estimates of an uplink channel wirelessly coupling, using frequency division duplexing via respective modular antenna elements of the base band unit pool, a user equipment to the base band unit pool, wherein determining the respective uplink channel estimates comprises determining the respective uplink channel estimates utilizing respective demodulation reference signals corresponding to data signals associated with the user equipment that have been received by at least one of the base station devices of the base band unit pool;
      based on the respective uplink channel estimates, deriving a downlink channel estimate of a downlink channel wirelessly coupling, using the frequency division duplexing via at least one of the respective modular antenna elements corresponding to a base station device of the base band unit pool, the base station device to the user equipment; and
      generating, using the downlink channel estimate, a group of downlink sector beams to be transmitted to the user equipment using the downlink channel via the at least one of the respective modular antenna elements corresponding to the base station device of the base band unit pool.

2. The system of claim 1, wherein determining the respective uplink channel estimates further comprises:
   determining the respective uplink channel estimates further utilizing the data signals, wherein the data signals have been received by the at least one of the base station devices utilizing a data channel wirelessly coupling the user equipment to the at least one of the base station devices.

3. The system of claim 1, wherein the downlink channel estimate comprises a downlink frequency response of the downlink channel, and wherein deriving the downlink channel estimate comprises:
   characterizing a channel delay spread of the uplink channel to obtain a characterization of the channel delay spread; and
   based on the characterization of the channel delay spread, an uplink frequency response of an uplink signal that has been received on the uplink channel, and an angle of arrival of the uplink signal, deriving the downlink frequency response of the downlink channel.

4. The system of claim 3, wherein characterizing the channel delay spread comprises:
   determining a statistical average of the uplink channel estimate
      over a defined period of time that is based on a channel time coherence of the uplink channel, and
      over a frequency span that is based on a frequency coherence bandwidth of the uplink signal.

5. The system of claim 1, wherein the downlink channel estimate comprises a downlink angle of departure of a downlink sector beam of the group of downlink sector beams, and wherein deriving the downlink channel estimate comprises:

based on an uplink angle of arrival of an uplink signal that has been received on the uplink channel, deriving, via resampling based on a ratio of an uplink carrier frequency of the uplink channel to a downlink carrier frequency of the downlink channel, the downlink angle of departure of the downlink sector beam.

6. The system of claim 1, wherein the operations further comprise:

transmitting, using the downlink channel via the at least one of the respective modular antenna elements corresponding to the base station device of the base band unit pool, the group of downlink sector beams to the user equipment, wherein the at least one of the respective modular antenna elements are positioned on an antenna tower or a rooftop of a building according to a group of available positions, wherein the group of available positions comprises an arbitrary position on the antenna tower or the rooftop, a horizontal position on the antenna tower or the rooftop, and a vertical position on the antenna tower or the rooftop, and wherein the at least one of the respective modular antenna elements are communicatively connected, via software corresponding to a baseband unit of the base band unit pool, to obtain a contiguous antenna comprising at least one of multi-panel or module connectivity to facilitate an enhancement of at least one of an aperture of the contiguous antenna or a performance of the contiguous antenna.

7. The system of claim 6, wherein transmitting the group of downlink sector beams comprises adapting, via the at least one of the respective modular antenna elements corresponding to the base station device of the base band unit pool, respective transmissions of the group of downlink sector beams to the user equipment, and wherein adapting the respective transmissions comprises modifying at least one of:

an uplink power control parameter,
a shape of a downlink sector beam of the group of downlink sector beams,
an azimuth of a transmission of the respective transmissions,
an elevation of the transmission,
a power of the transmission, or
a number of the downlink sector beams that are included in the group of downlink sector beams.

8. The system of claim 1, wherein the operations further comprise:

assigning, via the respective modular antenna elements, additional capacity from the base band unit pool to obtain an increased aperture and increased orthogonal beams to facilitate increased concurrent mobile terminal communications over common time slots and common frequency slots.

9. The system of claim 1, wherein the operations further comprise:

reducing an effect of passive intermodulation interference on uplink signals that have been received from the user equipment by transmitting, using the downlink channel via at least one modular antenna element of the respective modular antenna elements of the base band unit pool, at least one null directed to respective locations of a group of determined passive intermodulation interference sources.

10. The system of claim 9, wherein the operations further comprise:

Avoiding transmission of data in at least one of a first direction associated with the determined passive intermodulation interference sources or a second direction towards a beam associated with the determined passive intermodulation interference sources.

11. The system of claim 1, wherein the operations further comprise:

reducing an effect of passive intermodulation interference on uplink signals that have been received from the user equipment by
modifying, based on a received signal covariance function, a group of uplink weights to be applied to the uplink signals, and
applying, during uplink beamforming, the group of uplink weights to the uplink signals to emulate that at least one null has been directed to respective locations of a group of determined passive intermodulation interference sources.

12. The system of claim 1, wherein the data signals are first data signals, and wherein the operations further comprise:

determining respective determined locations of non-served cell user equipment using at least one of uplink pilot signals, sounding reference signals, or second data signals that have been received via the at least one of the respective modular antenna elements of the base band unit pool; and
reducing an effect of interference corresponding to transmissions of the non-serving cell user equipment on uplink signals that have been received from the user equipment by transmitting, using the downlink channel via the at least one of the respective modular antenna elements of the base band unit pool, at least one null directed to respective determined locations of the non-serving cell user equipment.

13. The system of claim 1, wherein the operations further comprise:

modifying a communication capacity of the downlink channel while satisfying corresponding communication conditions of the downlink channel by
assigning higher communication priorities to respective communications, via the uplink channel or the downlink channel, corresponding to at least one mobile device of a group of mobile devices corresponding to a determined communication bandwidth that is lower than remaining determined communication bandwidths of remaining mobile devices of the group of mobile devices other than the at least one mobile device, or
assigning higher transmission powers to the respective communications, via the uplink channel or the downlink channel, corresponding to the at least one mobile device of the group of mobile devices corresponding to the determined communication bandwidth that is lower than the remaining determined communication bandwidths.

14. The system of claim 13, wherein modifying the communication capacity further comprises:

estimating separability of the group of mobile devices via at least one of covariance cross correlation or identification of specific orthogonal beams corresponding to respective locations of the mobile devices, and
in response to estimating the separability of the group of mobile devices, modifying the communication capacity by determining whether to schedule parallel transmissions to the mobile devices.

15. The system of claim 14, wherein mobile devices of the group of mobile devices having different quality of service class identifiers are assigned distinct priorities corresponding to the parallel transmissions to facilitate differentiation of respective qualities of service corresponding to the group of mobile devices.

16. A method, comprising:
determining, by a system comprising a processor via a group of base stations using frequency division duplexing, uplink channel estimates of an uplink channel wirelessly coupling a user equipment to the group of base stations via respective modular antenna elements of the group of base stations, wherein determining the uplink channel estimates comprises determining the uplink channel estimates utilizing respective demodulation reference signals corresponding to data signals associated with the user equipment that have been received by at least one base station of the group of base stations;
based on the uplink channel estimates, determining, by the system, a downlink channel estimate of a downlink channel wirelessly coupling, using frequency division duplexing, a base station of the group of base stations to the user equipment via ones of the respective modular antenna elements corresponding to the base station; and
based on the downlink channel estimate, generating, by the system, a group of downlink sector beams to be transmitted, via the ones of the respective modular antenna elements corresponding to the base station, to the user equipment.

17. The method of claim 16, further comprising:
mitigating, by the system, interference from at least one base station of the group of base stations that is located at an edge of a wireless coverage area enabled by the group of base stations by reassigning at least one orthogonal pilot signal corresponding to non-served cell user equipment that are able to connect to the at least one base station.

18. The method of claim 16, further comprising:
reducing, by the system via a change of a characteristic of a passive gain of the ones of the respective modular antenna elements or via a reduction of respective transmit powers to a center portion of a cell corresponding to the respective modular antenna elements, an amount of energy corresponding to downlink transmissions via the ones of the respective modular antenna elements.

19. A non-transitory machine-readable medium, comprising executable instructions that, when executed by base station equipment comprising a processor, facilitate performance of operations, comprising:
deriving, using a base band unit pool of base station equipment, an uplink channel characteristic of an uplink channel wirelessly coupling, using respective modular antenna panels of the base station equipment of the base band unit pool via frequency division duplexing, a user equipment to the base band unit pool, wherein deriving the uplink channel characteristic comprises deriving the uplink channel characteristic utilizing respective demodulation reference signals corresponding to data signals associated with the user equipment that have been received by at least some of the base station equipment of the base band unit pool;
based on the uplink channel characteristic, deriving a downlink channel characteristic of a downlink channel wireless coupling, using a portion of the respective modular antenna panels via the frequency division duplexing, the user equipment to the base station equipment of the base band unit pool; and
based on the downlink channel characteristic, generating a group of downlink sector beams to be transmitted, using the downlink channel via the portion of the respective modular antenna panels, to the user equipment.

20. The non-transitory machine-readable medium of claim 19, wherein the operations further comprise:
using the portion of the respective modular antenna panels, adapting respective transmissions of the group of downlink sector beams to facilitate a reduction of interference corresponding to at least one non-served cell user equipment or a source of passive intermodulation interference.

* * * * *

UNITED STATES PATENT AND TRADEMARK OFFICE
CERTIFICATE OF CORRECTION

PATENT NO. : 12,120,052 B2
APPLICATION NO. : 17/971480
DATED : October 15, 2024
INVENTOR(S) : Ernest Tsui et al.

Page 1 of 1

It is certified that error appears in the above-identified patent and that said Letters Patent is hereby corrected as shown below:

In the Claims

-Column 23, Claim 7, Line 33 please delete "The system of claim 6, wherein transmitting the group of downlink sector beams comprises adapting, via the at least one of the respective modular antenna elements corresponding to the base station device of the base band unit pool, respective transmissions of the group of downlink sector beams to the user equipment, and wherein adapting the respective transmissions comprises modifying at least one of: an uplink power control parameter, a shape of a downlink sector beam of the group of downlink sector beams, an azimuth of a transmission of the respective transmissions, an elevation of the transmission, a power of the transmission, or a number of the downlink sector beams that are included in the group of downlink sector beams." and insert -- The system of claim 1, wherein the operations further comprise: assigning, via the respective modular antenna elements, additional capacity from the base band unit pool to obtain an increased aperture and increased orthogonal beams to facilitate increased concurrent mobile terminal communications over common time slots and common frequency slots. --

-Column 23, Claim 8, Line 50 please delete "The system of claim 1, wherein the operations further comprise: assigning, via the respective modular antenna elements, additional capacity from the base band unit pool to obtain an increased aperture and increased orthogonal beams to facilitate increased concurrent mobile terminal communications over common time slots and common frequency slots." and insert -- The system of claim 6, wherein transmitting the group of downlink sector beams comprises adapting, via the at least one of the respective modular antenna elements corresponding to the base station device of the base band unit pool, respective transmissions of the group of downlink sector beams to the user equipment, and wherein adapting the respective transmissions comprises modifying at least one of: an uplink power control parameter, a shape of a downlink sector beam of the group of downlink sector beams, an azimuth of a transmission of the respective transmissions, an elevation of the transmission, a power of the transmission, or a number of the downlink sector beams that are included in the group of downlink sector beams. --

Signed and Sealed this
Twenty-eighth Day of January, 2025

Coke Morgan Stewart
*Acting Director of the United States Patent and Trademark Office*